United States Patent [19]

Sansone

[11] Patent Number: 5,050,078

[45] Date of Patent: Sep. 17, 1991

[54] MAIL PROCESSING AND ACCOUNTING SYSTEM WITH COMMUNICATION AMONG PROCESSING UNITS AND DATA REFORMATTING

[75] Inventor: Ronald P. Sansone, Weston, Conn.

[73] Assignee: Pitney Bowes Inc., Stamford, Conn.

[21] Appl. No.: 416,734

[22] Filed: Oct. 3, 1989

[51] Int. Cl.⁵ ............................................. G06F 15/20
[52] U.S. Cl. ................................. 364/406; 364/464.03
[58] Field of Search ................... 364/408, 406, 464.02, 364/464.03, 479

[56] References Cited

U.S. PATENT DOCUMENTS

| | | | |
|---|---|---|---|
| 4,420,819 | 12/1983 | Price et al. | 364/464.03 |
| 4,760,532 | 7/1988 | Sansone et al. | 364/466 |
| 4,760,534 | 7/1988 | Fougere et al. | 364/466 |
| 4,800,504 | 6/1989 | Durst, Jr. et al. | 364/464.02 |
| 4,812,992 | 3/1989 | Storace et al. | 364/464.02 |
| 4,837,701 | 6/1989 | Sansone et al. | 364/464.02 |
| 4,849,884 | 7/1989 | Axelrod et al. | 364/464.02 |
| 4,853,864 | 8/1989 | Hart et al. | 364/464.02 |
| 4,853,865 | 8/1989 | Sansone et al. | 364/464.03 |
| 4,855,920 | 8/1989 | Sansone et al. | 364/464.02 |
| 4,873,645 | 10/1989 | Hunter et al. | 364/479 |

FOREIGN PATENT DOCUMENTS 2226988 7/1990 United Kingdom .

Primary Examiner—Gail O. Hayes
Attorney, Agent, or Firm—Peter Vrahotes; Melvin J. Scolnick; David E. Pitchenik

[57] ABSTRACT

A postal gateway system wherein information is conveyed through a gateway among a mailer, a post office, a bank, and a postal agent. With this gateway system, information can be sent virtually simultaneously to the various recipients so that each is current with regard to the mailing operations taking place and accounting therefor even though the format of data of the individual facilities are different.

13 Claims, 2 Drawing Sheets

MAIL PROCESSING AND ACCOUNTING SYSTEM WITH COMMUNICATION AMONG PROCESSING UNITS AND DATA REFORMATTING

RELATED PATENT APPLICATIONS

Co-pending U.S. patent applications having related subject matter are as follows: U.S. Pat. No. 5,005,124 entitled METHOD AND APPARATUS FOR CATEGORIZING AND CERTIFYING MAIL, filed Aug. 23, 1988; Ser. No. 285,486 entitled CENTRALIZED MAIL USE DATA BASE, filed Dec. 16, 1988; U.S. Pat. No. 2,949,272 entitled FLEXIBLE BILLING RATE FOR MAIL COMMUNICATION SYSTEMS, filed Dec. 16, 1988; Ser. No. 282,713 entitled APPARATUS AND METHOD FOR THE PROCESSING OF MAIL, filed Dec. 13, 1988; and U.S. Pat. No. 285,891 entitled CENTRALIZED POSTAGE DATA COMMUNICATION NETWORK, filed Dec. 16, 1988.

BACKGROUND OF THE INVENTION

Initially, the processing of mail involved a mailer dropping a piece, or pieces of mail into a mailbox, having the post office pick up the mail from the mailbox, transporting the mail piece to a post office and directing the mail to its ultimate destination, whether this destination be local or out of town. As time progressed, large mailers would deliver the mail directly to the post office where the mail would be inspected, sorted and forwarded. The post office found that if the mailers were given postal discount rates for performing certain acts, such as presorting of mail, bundling the mail, and the like, a great deal of time would be saved by the post office. As a result of such discounting, large mailers were encouraged to preprocess their mail and mail processing equipment such as scales, inserters, folders, and the like were developed to assist the mailer in his mailing operations. As a further development of streamlining mail processing, permit mail was created whereby the mailer was not required to place postage upon each mail piece, but rather was able to deliver the mail pieces to the post office in batch form. A statement sheet, such as a postal form 3602, would accompany the mail so that an accounting could be made for postage required for the mail.

Although what is outlined above worked fairly well for a period, with the different rate classifications and the increase in amount of mail being processed by the post office the post office began experiencing delays in processing the mail. Presently, billions of pieces of mail per day are being handled by the post office. This is placing a heavy burden on the post office with an attendant delay in the delivery of mail, as well as loss of postage due to inefficiencies in accounting due to the sheer volume.

As a result of the above problem, postal authorities had discussions with mailers and mail equipment manufacturers for the purpose of developing schemes that would be useful to the post office and allow the post office to process mail more quickly, efficiently and economically. As a result of these discussions, certain worksharing routines have been proposed whereby the mailer and certain mailing agents would perform tasks that would assist the post office in the processing and the delivery of mail. As an example, batch letter mail sent to the post office would be certified either by the mailer, or by a postal agent, whereby the certification of the mail assured the post office that the called for quantity of mail was accurate and that the postage being paid to the post office was sufficient. Another scheme involved certifying the deliverability of the mail. These schemes, and others like them, are still in the evaluation stage. These schemes have overlooked somewhat two areas of concern, the communication among the various units that participate in the processing of mail, and in the payment of mail. Heretofore, the mailer was required to purchase postage in advance and charges for the delivery of mail would be subtracted from the purchased amount. This was obviously costly to the mailer because of the need to maintain non-interest bearing funds in a device such as a postage meter. With regard to communication among various units, this is a problem because of the different protocols and formats used by different networks.

SUMMARY OF THE INVENTION

The present invention is related to a system whereby dedicated communication is established among those facilities that are involved in the processing mail. In accordance with one aspect of the invention, a data communication system is established between four principal facilities involved in mail processing. In accordance with another aspect of the invention, a reformatting and translation system, hereafter referred to as a postal gateway system, has been conceived whereby postal information is processed that is received from networks with the postal gateway acting to reformat and traffic all the mailing information and postage data. With such a postal gateway, the mail processing participants are able to obtain information simultaneously even though the individual facilities of the system use different communication protocol and data formats. One of the facilities in the network is a bank that has mailer accounts and one or more post office accounts. Upon notification that mail has been received by the post office from a mailer, funds can be transferred from the mailer's account to that of the post office. A second facility of the system is a postal agent who supply mailing information to the mailer, mail delivery information to the post office, and funds information to the bank. The third and fourth facilities are the mailer or mailers, and the post office.

DETAILED DESCRIPTION OF THE PREFERRED EMBODIMENTS

Figure 1:
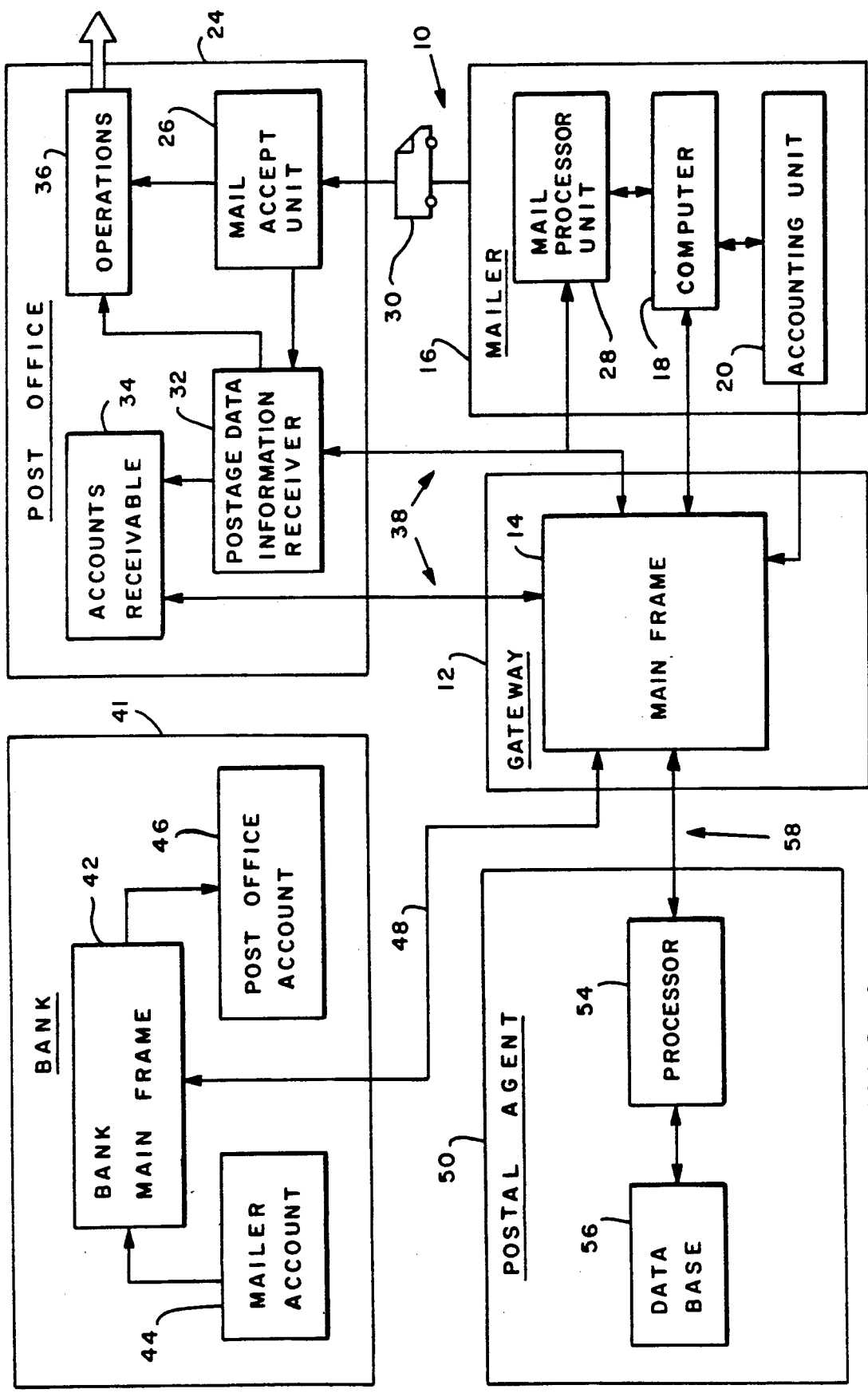
FIG. 1 is a block diagram showing an overall view of the postal networking system.

Referring initially to FIG. 1, a gateway postal system is shown generally at 10 and includes a gateway 12 having a main frame computer 14 such as a Model 4300 series main frame computer available from IBM Corporation of Armonk, N.Y. The main frame computer 14 is in communication with a plurality of mailers of which one is shown represented by block 16. The mailer 16 has a computer 18 which communicates with the gateway through communication lines 22. Details of the mailer will be given later with reference to FIG. 2. (As used herein "gateway" shall be understood to mean a facility for coordinating data flow among a mailer, a post office, a bank and a postal agent.)

Also in communication with the gateway 12 is a post office 24 that has a mail acceptance unit 26 which receives mail that is physically sent from the mailer 16 to the post office such as by way of truck 30. It will be appreciated that although only one mailer 16 and one post office 24 are shown, the gateway 12 is normally in communication with a number of post offices, and each post office in return would be receiving mail from a large number of mailers. By the same token, the mailer 16 may send mail to more than one post office 24 such as a local post office or a regional post office when all the mail is for a specific region. The post office 24 has a postage data information receiver 32, and an accounts receivable unit 34, each of which is in communication with the gateway 12. An operations unit 36 is in communication both with the postage data information receiver 32 and the acceptance unit 26. The operations unit 36 of the post office 24 is that portion of the post office that processes the mail received from the mailer.

A bank 41 has a main frame computer 42, such as a Model 4300 IBM computer, that includes a mailer account 44 and a post office account 46. Although these two accounts can be part of a single database that will hold a large number of accounts, including other mailer and post office accounts, they are segregated for purposes of explanation. The gateway main frame computer 14 is in communication with the bank through communication lines 48.

A postal agent 50 has a processor 54, that may be a main frame processor, and a database 56. The postal agent 50 is in communication with the gateway 12 through communication lines 58. The information that will be transmitted by the information lines 58 would relate to mailer address information, certification information, postage information, in terms of volumes of mail and postage dollars, and other information that would be conveyed from the postal agent to the mailer 16 post office 24 and bank 41. With reference to related U.S. patent application Ser. No. 285,891, it will be understood that the postal agent as described herein corresponds to the data center or central station as described in said related application. The manner in which a mailer processes its mail and records mail parameters herein can be the same as described in said related application. Similarly, the programming of the postal agent's and mailer's computers herein can be similar to what is described in said related application. The disclosure of said U.S. patent application Ser. No. 285,891 is incorporated herein by reference.

As examples of computers in the specification, similar IBM model computers are listed which use similar, or the same, formatting of data and protocols, but it will be appreciated that in systems, involving many mailers and perhaps several banks, the systems must be able to tolerate the likely possibility of a variety of data processing machines generating data in different formats and with different protocols. Hence, the presence of the gateway 12 ensures compatible data communication irrespective of the kind of data processors employed by the various facilities. It will also be appreciated that the gateway 12 need not be a separate entity as shown in FIG. 1. The present invention contemplates the gateway 12 being associated with one of the four principal facilities, such as the postal agent. Those skilled in the art will also recognize that it is well within the skill of computer scientists and programmers using known technology to assemble and program the data communications system herein described. For example, a known program for protocol conversion is the ANSI X.12 Standard Protocol Converter.

Figure 2:
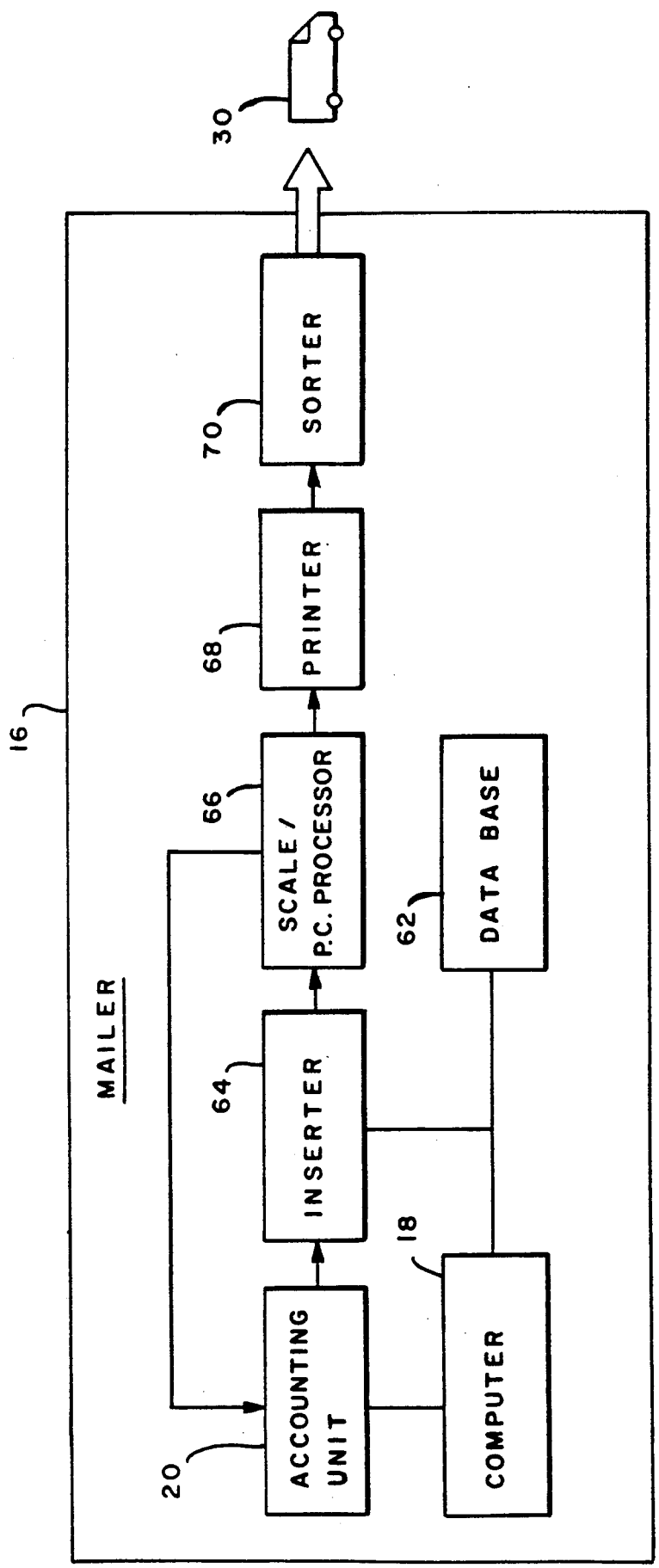
FIG. 2 is a block diagram of the mailer portion of FIG. 1 shown in greater detail.

With reference to FIG. 2, details of the mailers location 16 will be given. As stated previously, the mailer 16 will have an accounting unit 20 that is able to securely store postage value and dispense postage value upon the processing of mail. An example of a type of accounting unit capable of performing this function is shown and described in U.S. Pat. No. 4,743,747, and reference can be had to this patent for details of an accounting unit. The disclosure of U.S. Pat. No. 4,743,747 is incorporated herein by reference. The computer 18 has a database 62 and is in communication with the accounting unit 20 and an inserter 64 whereby information, such as mailer address information can be communicated to the inserter 64 and postage information can be received from the accounting unit. A combination scale/processor 66 is in communication both with the accounting unit 20 and the inserter 64, the communication between the scale/processor 66 and inserter being a physical one, and the communication with the accounting unit being electronic. Downstream from the scale/processor 66 is a printer 68 that is capable of printing data upon the face of a mail piece, and downstream from the printer is a sorter 70 that will sort the mail such as by zip codes. After the mail is sorted, the same is loaded onto a truck 30 to be sent to the post office mail acceptance unit 26.

With reference to FIG. 1, the operation of the system shown at 10 will be described. The gateway main frame 14 acts as a data flow coordinator among the mailer 16, the post office 24, the bank 41, and the postal agent 50. The gateway 12 will provide communication among these facilities despite their diverse protocols and formats and the gateway 12 will reformat the data as required. The postal agent facility will have current mailing addresses stored in its data base 56 from the National Correction Address List (NCAL) and will forward requested mailing address information required by a mailer preceded by a header. The postal agent will have approved access to the NCAL and will keep the information in its database current and updated for a large number of mailers in accordance with guidelines mandated by the post office. Another function served by the Postal Agent 50 is to trigger funds transferred from the mailer's account 44 to the post office account 46. The mailer 16 generates mail, data describing that mail, and postage required for a mailing statement that is required by the post office, such as the postal form 3602, with the delivery of batch mail. This data will include the amount of postage required to post the mail, class and classification of the mail, a quality statement that states how easily the address can be read and a report of deliverability with regard to the accuracy of the addresses and zip codes. The classification of mail would include the zip code, zip code +4, all of which may be in the form of a postal bar code. The post office receives this data from the mailer and uses it for acceptance and accounting purposes, certification of the mail, and determination of the operators performance. Based upon this information the post office would grant the mailer a discount for services performed such as postal bar coding, pre-sorting, readability, reliability and the like. Furthermore, based on this information, the post office knows what is coming and can schedule personnel, transportation and mail processing equipment accordingly.

This information is also forwarded to the postal agent by the mailer, and the mail is physically carried to the post office as by truck 30.

The mailer notifies the post office as to the sending of individual batches of mail and the ultimate destination of such mail, the count and the amount of postage. It should be noted that no money is sent to the bank 41 by the mailer 16 but is handled by the postal agent 50.

The postal agent 50 receives and stores the information forwarded by the mailer 16 in the form of the header that is followed by the mailing information. The header contains information such as identification of the mailer 16, when the mailer's address list was updated, type of equipment used by the mailer, the last inspection date of the equipment and the like that will allow the postal agent 50 to monitor the mailer. After the mailer is identified by the header, the subsequent information that relates to a particular mail run is placed into the database 56. Based upon information received by the mailer 16, as well as other mailers, the postal agent is able to provide certification for the immediate mail and a profile relative to quantity and quality of mail that has been sent to the post office over a long term. Based upon the profile that is developed from this, data relative to the mailer can be communicated to the post office which can then determine the postage rate to be applied to the mailer in accordance with the practices of the mailer.

The bank 41 receives information from the postal agent 50 relative to the amount of funds to be transferred from the mailer account 44 to the post office account 46 based upon rates determined for the mailer by the post office as a result of the profile information received by the post office from the postal agent. The bank then contacts the post office 24 and determines when the mail has been received from the mailer 16 by the post office 24. Upon the notification by the bank that the mail has been received, funds are then transferred from the mailer account 44 to the post office account 46 in accordance with the established postal charges. The bank then notifies both post office and the postal agent 50 that a funds transfer has taken place. With such a scheme, there is no need for prepayment on the part of the mailer. More specifically, the mail is paid for as received. In this way, the mailer is able to continue receiving interest on the funds deposited in his account 44 at the bank 41 until such time as the mail is actually received by the post office 24. In the meantime, the postal agent 50 is acting as a surety to both the bank and post office that the mail being delivered is of the quality and quantity as indicated by the mailer 16 and transmits information relative to such quality and quantity through the gateway 14. The quality and quantity is obtained by the postal agent 50 from communication with the mailing equipment in the mail processing unit 28 of the mailer location 16 by way of the gateway 14. In this way, as the mail is received by the post office 24, it has assurance the postage and quality of mail are acceptable without the need of inspection.

Thus, what has been shown and described is a postal gateway system whereby networking systems of four principal facilities with different languages, formats and protocols can communicate with one another through a gateway. With this system the parties concerned with the posting of mail and payment therefor are constantly updated and verification takes place as to the transactions occurring.

What is claimed is:

1. A postal gateway system for processing data relating to postal functions, comprising:
   a gateway having first computer means,
   a postal agent having second computer means and a database for storing recipient address and mailer data,
   means for providing communication between said gateway and said second computer means,
   a mailer location having third computer means and mail processing means,
   means for providing communication between said mailer location and said gateway,
   a post office facility having fourth computer means, accounts receivable means, and mail processing means,
   means for providing communication between said gateway and said fourth computer means,
   a bank having fifth computer means including a post office account and a mailer account, and
   means for providing communication between said gateway and said fifth computer means.

2. The postal gateway system of claim 1 wherein at least one of said second, third, fourth and fifth computer means has a different form of data than the others and said gateway has means for reformatting said different form of data so as to provide communication among said second, third, fourth and fifth computer means.

3. The postal gateway system of claim 1 wherein said second computer means has means for determining the quality and quantity of mail processed by said mailer mail processing means by communication therewith through said gateway.

4. The postal gateway system of claim 1 wherein said second computer means has means for sending data to said gateway and to said third computer means in the form of a header that gives status information followed by current recipient address and mailer data.

5. The postal gateway system of claim 4 wherein said header includes the date address information is sent to said third computer means.

6. The postal gateway system of claim 4 wherein said third computer means includes means for sending data through said gateway to said second computer means in the form of a header that gives status and identification information followed by current data.

7. The postal gateway system of claim 1 including means for providing communication between said gateway and said post office facility accounts receivable means.

8. A postal communication system for processing data relating to postal functions, comprising:
   a postal agent having first computer means and a database for storing mailer information,
   at least one mailer location having second computer means and mail processing means,
   at least one post office facility having third computer means, accounts receivable means, and an operations unit,
   a bank having fourth computer means comprising a post office account and a mailer account, and
   means for providing communication between at least said first computer means and said second, third and fourth computer means.

9. The postal communication system of claim 8 wherein at least one of said first, second, third and fourth computer means has a different form of data than the others and including means for reformatting said different form of data so as to provide communication among said first, second, third and fourth computer means.

10. The postal communication system of claim 8 wherein said first computer means has means for determining the quality and quantity of mail processed by said mailer mail processing means by communication therewith.

11. The postal communication system of claim 8 wherein said first computer means has means for sending data to said third computer means in the form of a header that gives status information followed by current data.

12. The postal communication system of claim 11 wherein said header includes the date of address information sent to said third computer means.

13. The postal communication system of claim 11 wherein said second computer means includes means for sending data to said first computer means in the form of a header that gives status and identification information followed by current data.

* * * * *